United States Patent [19]

Schick et al.

[11] Patent Number: 5,448,359
[45] Date of Patent: Sep. 5, 1995

[54] OPTICAL DISTANCE SENSOR

[75] Inventors: Anton Schick, Schwindegg; Richard Schneider, Taufkirchen; Michael Stockmann, Bruckmühl, all of Germany

[73] Assignee: Siemens Aktiengesellschaft, Munich, Germany

[21] Appl. No.: 244,622
[22] PCT Filed: Nov. 3, 1992
[86] PCT No.: PCT/EP92/02522
§ 371 Date: Jun. 17, 1994
§ 102(e) Date: Jun. 17, 1994
[87] PCT Pub. No.: WO93/11403
PCT Pub. Date: Jun. 10, 1993

[30] Foreign Application Priority Data

Dec. 4, 1991 [DE] Germany ............ 911 20 863.5

[51] Int. Cl.⁶ .................... G01B 11/06; G01B 11/24
[52] U.S. Cl. .................... 356/375; 250/559.29; 356/376
[58] Field of Search .......... 356/375, 376; 250/561

[56] References Cited

U.S. PATENT DOCUMENTS 4,798,469  1/1989  Burke .................. 356/376

FOREIGN PATENT DOCUMENTS

| 61-169708 | 7/1986 | Japan . |
| 2144537 | 3/1985 | United Kingdom . |
| 868341 | 9/1981 | U.S.S.R. .......... 356/375 |
| WO88/10406 | 12/1988 | WIPO . |

OTHER PUBLICATIONS

"Chromatic Focusing Technique", IBM Technical Disclosure Bulletin, vol. 27, No. 12, May 1985, pp. 6850–6851.
"Optische Höhenmessung über eine Linie", 592 Neues aus der Technick, May 1986, No. 2, Würzburg, Deutschland, pp. 5–6.

Robotic Vision Systems, Inc., one page. undated.
"Vision Systems for PCB Manufacturing", Papers for IECON '90 Special Session of Yano, et al., one page.
"Vision Systems for PCB Manufacturing", Papers for IECON '90 Special Session by Muraoka, one page.
"Vision Systems for PCB Manufacturing", Papers for IECON '90 Special Session by Kobayashi, et al., one page.
"3-D Profile Detection of Etched Patterns Using a Laser Scanner (3D-Scan Detection) for Automatic Inspection of Printed Circuit Boards", reprint from the Proceedings of SPIE-The International Society for Optical Engineering, vol. 389, Jan. 20–21, 1983, pp. 44–52.

Primary Examiner—F. L. Evans
Attorney, Agent, or Firm—Hill, Steadman & Simpson

[57] ABSTRACT

In order to set up a height raster image for the inspection of complex units, for example of equipped printed circuit boards, optical distance sensors are employed. In this case, the known triangulation method or the likewise known confocal principle is employed. A sensor which permits a complete inspection in an acceptable time must cope with an appropriately high data rate. To this end, a distance sensor is described, which at the same time exhibits a high resolution and a low sensitivity in relation to secondary light reflexes. The essential features reside in: 1) a measurement beam (19) which is shaped to be substantially larger than the illumination beam (18) with respect to the diameter; 2) an approximately equal diameter of the two beams at the measurement location, the illumination beam (18) exhibiting a greater depth of focus (T) than the measurement beam (19), 3) a beam splitting unit (154) for splitting the measurement beam (19) with approximately point photodetectors which are disposed in each partial beam and which are disposed one behind the other in the direction of the partial beams and the respective height level within the depth of focus (T) is recognizable by the photodetector with the greatest light intensity.

15 Claims, 4 Drawing Sheets

OPTICAL DISTANCE SENSOR

BACKGROUND OF THE INVENTION

1. Field of the Invention

The invention relates to an optical distance sensor according to the confocal optical imaging principle for the determination of height values and for three-dimensional surface measurement. Preferred fields of application are, especially, the inspection of soldered joints and the monitoring of the component quality in the case of high-density electronic printed circuit boards, such as for example multi-chip modules.

2. Description of the Related Art

In the inspection of the soldered joints or components of a printed circuit board, an investigation is essentially carried out for conductor track constrictions, impurities due to particles, soldered joint quality, correct placing of connecting pads, short circuits etc. As a result of the increasing intensification of the packing density of components in microelectronics, the inspection of three-dimensional objects with high resolution and at high speeds of inspection is becoming necessary. In particular, unequipped and equipped micromotherboards are to be automatically inspected.

Previously known devices for the recording of height raster images, which comprise a multiplicity of three-dimensionally existing points of object surfaces, are essentially based on the so-called triangulation method. In this method, a laser beam scans the surface of the object. The two planar space coordinates of a determined surface point are known by the relative position between scanning beam or illumination beam and the printed circuit board. The height coordinate of the surface point which is currently being measured is acquired by at least one laterally disposed objective in conjunction with a position-sensitive detector. In this way, it is possible to determine the three-dimensional space coordinates of a multiplicity of surface points. By the comparison of a recorded surface image with an ideal surface image and with consideration being given to specified error criteria, defects on printed circuit boards can be automatically recognized.

The abovementioned triangulation method has been further developed in various respects, but exhibits particular fundamental disadvantages:

there is the danger of secondary light influences if the detector receives the reflected light from surface points of the object which do not correspond to the current point of incidence. In the case of very glossy surfaces, this may lead to considerable errors of measurement.

Small objects which are situated very close to relatively large objects or in depressions cannot in every case be sensed, as a consequence of shadows.

In order to observe the Scheimpflug condition, in most cases a non-enlarging imaging onto the detector is required. In the case of small measurement spot sizes, this leads to high power densities. A high power density on the detector surfaces in the case of lateral photodiodes places an upper limit upon the speed of scanning. The use of photodiode arrays does not increase the data rate.

It is hitherto not known to vary the imaging scale and thus the resolving power by simple exchange, for example, of an objective on the sensor system.

Commercially available measuring systems according to the triangulation method exhibit particular refinements by means of which the abovementioned disadvantages are in part avoidable. Thus, the company Robotic Vision Systems (536 Broadhollow Road, Melville, N.Y. 11747, USA) has employed linear photodiode arrays in place of lateral photodiodes for the purpose of avoiding erroneous measurements due to secondary reflexes. Erroneous measurements are recognized and eliminated by appropriate evaluating software. In total, however, the data rate of the system is reduced so greatly that this system is not suitable for a full inspection in a processing line.

In order to cope with the problems in the application of a lateral photodiode, the company Matsushita Kotobuki Electric Co., Ltd. (2131 Ohara-minamikata, Kawauchi-machi, Onsen-gun, Ekimeken 791-03, Japan) has developed a system with which observation takes place from eight directions. An evaluation of the detector signals is executed by appropriate algorithms. The reliability of recognition in the case of glossy surfaces is enhanced as a result of this. The overall construction becomes very costly as a result of the use of approximately four sensor heads each having eight detectors, which scan by means of a rapidly rotating disk. Over and above this, the system is unable to measure within deep holes. A resolution greater than 40 μm is not achieved, on account of mechanical and optical adjustment problems in the course of the rapid rotation of the sensor head.

The company Nagoya Electric Works Co., Ltd (550 Takawari, Katori, Tadocho, Kuwana-gun, Mieken 511-01, Japan) scans with a laser beam over an equipped circuit board and measures the angle of the specular reflection. By the evaluation of the surface inclination of soldered joints or components, the absolute height can be determined by integration. Inclinations which amount to more than 45° cannot however be detected. As a result of this, the height of objects with vertical walls cannot be measured. A measurement within small holes is not possible and secondary reflexes or reflections cannot be eliminated.

A likewise known system is offered by the company Omron Institute of Life Science (17 Chudoji minami-cho, Shimogyo-ku, Kyoto 600, Japan). In this case, the height information is obtained from the specularly reflected light. The specimen is illuminated from various directions with three different colors. The specularly reflected light is detected by a color camera and the inclination of the specimen surface is computed. The power level approximately corresponds to the system from Nagoya.

In general, it can be stated that secondary reflexes or reflections occurring on neighboring soldered joints, especially in the case of soldered joints with specular surfaces, result in erroneous information and correspondingly false height values if detector surfaces are large. The use of small detector surfaces is to be aimed at, since as a result of this only the immediate environment of the measurement location to be instantaneously imaged is acquired. This is taken into consideration by the use of a synchronized triangulation scanner. In this case, the detection beams are directed by means of two laterally fitted deflecting devices via the scanning objective and the beam deflection unit (a rotating polygonal mirror) onto the detector surface. As a result of the synchronous beam deflection of the illumination beam and measuring beam (detection beam), only the height movement of the point of incidence is imaged onto the detector, whereby the latter can be dimensioned to be correspondingly narrow and secondary reflexes in the direction of scanning are masked out. Disturbing reflexes occurring perpendicular to the direction of scanning cannot be illuminated thereby. As a result of the design of the system, the point of incidence of the light or the measurement location can be observed only from two directions in space. In the case of high-density circuit boards, this leads to considerable occlusions.

A method which has already proved to be useful in the three-dimensional measurement of structures is based on the confocal principle. In this case, a point light source which is usually defined by an aperture diaphragm is imaged onto the specimen or the object. The backscattered light is again imaged onto an almost punctiform detector. In this case, the maximum light intensity impinges only on the detector (photodetector) if the object plane and the detector plane actually lie at the focus of the respective optical system (confocally). If the object is situated outside the focal plane, then the result is a great broadening of the measurement beam ahead of the point detector, whereby the measurable intensity decreases to a great extent.

A sensor based on the confocal principle is described, by way of example, in the article —3-D profile detection of etched patterns using a laser scanner; Moritoshi Ando et al; Proceedings of SPIE, Vol 389, Optical Systems Engineering III; Los Angeles, Calif., USA; 20th–21st Jan. 1989. In particular in FIGS. 2 and 3, it is shown that the object plane and the sensor plane lie in each instance in the region of the focus. Furthermore, this article describes the use of scanning lenses, as well as a rotating polygonal mirror as beam deflection unit. According to the confocal principle, the axes of illumination beam and detection beam are identical in the region of the objective.

SUMMARY OF THE INVENTION

An object of the invention is to provide an optical distance sensor having a high data rate with a simultaneously high resolution and low sensitivity with respect to secondary-light reflexes or reflections.

This and other objects and advantages of the invention are achieved by an optical distance sensor for confocal optical imaging to determine height values and for three-dimensional surface measurement, especially for the inspection of electronic printed circuit boards, having a point light source which is imaged onto the surface to be measured, a beam deflection unit for stepwise scanning of the surface, a scanning objective through which an illumination beam and a measurement beam are conducted and a photodetector disposed confocally with the point light source, the illumination beam being of a substantially smaller diameter in relation to the measurement beam in the aperture of the scanning objective, the illumination beam and the measurement beam being of approximately equal diameter at the measurement location on the object surface, the illumination beam exhibiting a distinctly greater depth of focus than the measurement beam, a beam splitting unit for splitting the measurement beam into a plurality of split measurement beams, behind the beam splitting unit in each instance in the direction of the split measurement beams there being disposed an optical system and an approximately punctiform photodetector, the photodetectors being disposed to be offset in a direction of the split measurement beams for distinguishing height values within a depth of focus of the illumination beam and the respective height level being recognizable by the photodetector impinges with a greatest light intensity, the approximately punctiform photodetectors being of diameters so that the diameters of the illumination beam which alter with the height are imaged within the depth of focus precisely into the associated photodetectors.

A sensor which is based on the confocal principle operates using a point light source which is imaged onto the object. The light which is backscattered from the object is, for its part, imaged onto an nearly punctiform detector. Object and image or respectively detector are situated at the focus of the illumination beam or respectively of the measurement beam. The low depth of field associated therewith is associated with a high resolution in the recording of surface points for the three-dimensional measurement of objects.

The height information to be recorded or the height value is obtained, in a similar manner to the triangulation method, by vertical illumination and observation at the greatest possible angle to the normal to the object surface. However, when using a scanning objective which conducts the illumination beam and the measurement beam at the same time and where the illumination beam diameter is designed to be substantially smaller than the measurement beam diameter, viewing takes place over the entire aperture cone of the objective. Thus, all beams proceeding from the point of incidence of the illumination beam on the object surface are taken into consideration in the course of the measurement. The solid angle which contributes to the detection is accordingly substantially larger than that of the triangulation method.

The invention is based on the finding that a data rate which is sufficient for current requirements can be achieved by means of an optical distance sensor which represents a modification of a confocal principle. In order to circumvent the relatively slow mechanical lateral and axial object displacement in the course of the recording of a rastered surface image, a plurality of parallel-operating, nearly punctiform photodetectors were installed in accordance with the multisplit measurement beams. The photodetectors are all disposed in a confocal configuration and represent a subdivision of the height measurement range which is predetermined by the depth of focus of the illumination beam, when the object is not displaced in height. Accordingly, this maximum height measurement range is subdivided into a plurality of levels which can be resolved without mechanical readjustment of the object. To this end, it is necessary to provide an arrangement of the point photodetectors which is offset in relation to the various split measurement beams. The diameters of the photodetectors are designed so that the diameters of the illumination beam within the depth of focus which alter with the measurement height are imaged precisely into the associated photodetectors. The respectively applicable height level within the depth of focus of the illumination beam is recognized by the photodetector with the greatest light intensity.

An advantageous refinement of the invention provides the use of splitter mirrors as beam splitting units. In spite of the mechanical complexity, beam splitter mirrors represent the simplest type of a beam splitting unit. This applies to a splitting of the measurement beam into up to approximately 20 individual beams.

A constructional simplification is achieved by the use of a single light-diffracting element. This element, acting as beam splitting unit, splits the measurement beam into a multiplicity of defined directions. The actual detection remains unchanged. A particular feature of this embodiment resides in an adapted optical system. In place of an optical system placed conventionally behind the beam splitting unit in each individual split measurement beam, when using a light-diffracting element it is possible to use a single optical system. This is inserted either ahead of or behind the light-diffracting element. In this way, the entire measurement beam or all split measurement beams are conducted via this optical system. The light-diffracting element employed may be, for example, a diffraction grating of a computer-generated hologram with a defined intensity distribution.

The point configuration of the photodetectors is expediently achieved by the combination of diaphragms and commercially available photodetectors, for example photodiodes. Thus, the entire unit represents the point photodetector, which is disposed in a confocal configuration, if the diaphragm lies in the region of the focus of the measurement beam. This applies to all diaphragms or photodetectors which are placed on the partial beams.

An advantageous refinement of the invention makes use of a scanning objective which is corrected for a plurality of wavelengths in such a manner that a chromatic aberration is intentionally created. The height scanning region predetermined by the depth of field of the illumination beam is, in this case, split into individual levels, in which the depth of field ranges of the individual colors follow one another in succession in a row. After the passage of the light through the diaphragms connected upstream of the point photodetectors, the light is split according to the colors and conducted to different photodiodes.

The point light source is advantageously represented by a laser. The laser delivers the measurement beam, which is imaged sharply by means of an optical system onto the surface of an object. In this case, it is possible to use a laser giving monochromatic light or giving a light of a plurality of wavelengths. The latter is required where a scanning objective corrected for a plurality of optical wavelengths is employed. The high power density of a laser is of substantial advantage.

In order to achieve a high data rate in the course of the recording of a surface raster image, an appropriately adapted beam deflection unit is required. It has proved to be very advantageous in this case to use a rotating polygonal mirror, since the interplay of mechanical drive and the achievement of high data rates can be managed well in this case. In combination with a small diameter of the illumination beam at the location of the polygonal mirror, high rates of rotation are made possible together with, at the same time, a small design of the polygonal mirror.

The separation between illumination beam and measurement beam takes place by a centrally perforated coupling-out mirror. This advantageous refinement is designed with respect to the predetermined ratio between the numerical apertures of the measurement beam and of the illumination beam.

It is of great importance if the aperture of the measurement beam is greater than that of the illumination beam at the measurement location. The ratio between measurement aperture and illumination aperture is a measure of the number of height levels which can be measured in the respective height measurement range. In the case of almost isotropically scattering objects it is possible to evaluate height values between these height levels by interpolation. If the aperture of the measurement beam is designed to be substantially greater than that of the illumination beam, then the light of the observation location on the object is collected at a large angle to a surface normal of the object or over a large solid angle. This improves the height resolution to a substantial extent. Likewise, it is advantageous that a noise caused by speckle is suppressed by a large ratio of the detection aperture to the illumination aperture. The ratio at least to be aimed at between the aperture angles of measurement beam and illumination beam should amount to 2:1.

A simplification of the optical distance sensor associated with an increase in the data rate is achieved by the use of a telecentric scanning objective. This results, in essence, in the saving of a computing procedure which would be necessary in the case of a non-telecentric design of the scanning objective, for the precise determination of the position of an image.

The non-uniform light distributions, which as a rule, occur of the partial beams onto the various photodetectors are advantageously compensated by an electronic compensating unit. Non-uniform distributions of the light intensity arise depending upon the design of the beam splitting unit and the diaphragm diameters.

The alteration of the height measurement range can advantageously be achieved by changing the scanning objective. This takes place in a similar manner to that applicable in the case of a microscope objective. In view of the fact that the measurement range and resolution are interdependent, a pertinent electronic tuning must be undertaken. This permits an easy conversion of a scanning device. As a result of the lateral inclination of an optical distance sensor, it is possible to inspect printed circuit boards prepared using differing technology for equipping the boards (by way of example, "surface mounted devices", "J-leads" . . . ).

BRIEF DESCRIPTION OF THE DRAWINGS

The confocal principle and an illustrative embodiment are described hereinbelow with reference to diagrammatic figures.

DETAILED DESCRIPTION OF THE PREFERRED EMBODIMENTS

Figure 1:
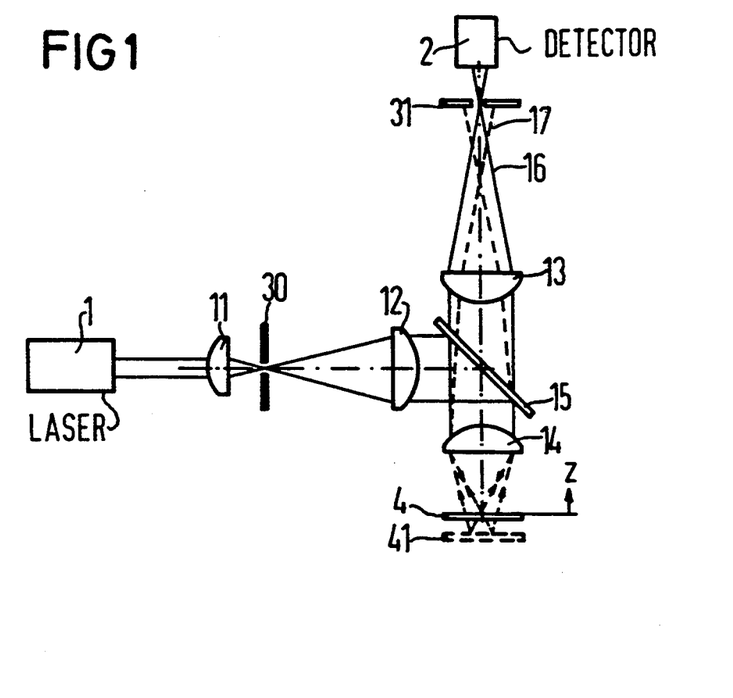
FIG. 1 shows schematic illustration for explaining the confocal principle.

FIG. 1 shows a mode of procedure which has already proved to be useful in the three-dimensional measurement of structured surfaces. This mode of procedure is based on the confocal principle. In the case of the confocal principle, a point light source, for example formed by means of an aperture diaphragm, or, as in this case, by a laser 1, is imaged onto the object. The backscattered light is in turn imaged onto an nearly punctiform detector. Only in the case where the object plane and detector plane actually lie at the focus, i.e. are confocal, does the maximum light intensity impinge upon the detector. In this case, it has to be borne in mind that the point construction of each one of the two mentioned components takes place by the respective upstream connection of a confocal diaphragm 30, 31. Accordingly, the laser 1 with the optical system 11 and the diaphragm 30 can be considered as a point light source. The point detector comprises the diaphragm 31 and the actual detector 2, for example a photodiode. A confocal configuration is represented by the beam path of the focused beam 16. In this case, the object 4 lies in the focal plane with respect to the optical system 14. The same applies to the diaphragms 30, 31 with respect to the optical system 12, 13. If the object 41 is situated outside the focal plane, then a high degree of beam broadening takes place in accordance with the defocused beam 17. This is synonymous with a great decrease in intensity at the detector 2.

As a result of the confocal system, there is indeed a small depth of field which, however, results in a high resolution. The arrangement represented in FIG. 1 operates using a splitter mirror 15. The objective, in this case the optical system 14, is designed so that no differences whatsoever between the aperture of the measurement beam and the aperture of the illumination beam can be detected.

Figure 2:
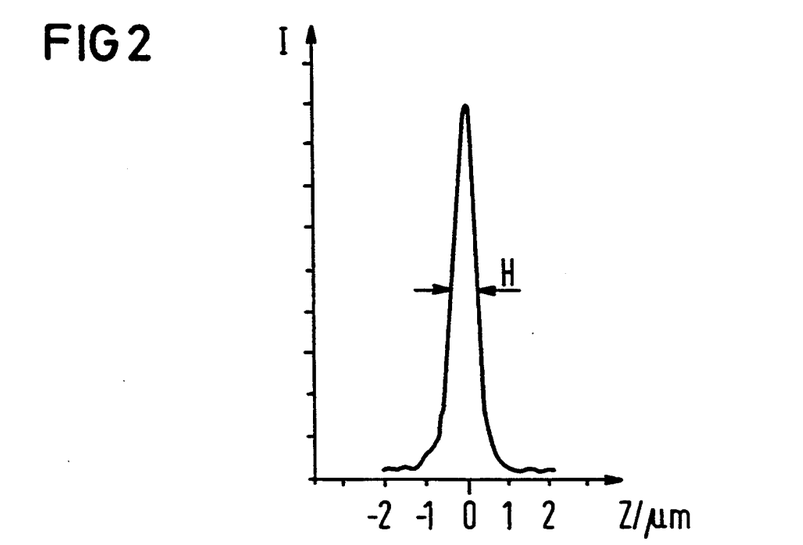
FIG. 2 shows a graph of the progression of the light intensity during a mechanical height scan at a point of a flat object surface.

FIG. 2 shows the progression of the intensity I of the detected light as a function of the height value Z. In order to record this curve, an object was displaced in such a manner that its height value is displaced on both sides of the value which corresponds to the confocal setting with the maximum intensity I. An evaluation criterion is represented by the full half-power width H. This is understood as referring to the range of the height value Z which corresponds to a drop in the intensity I to one half of the maximum value.

Figure 3:
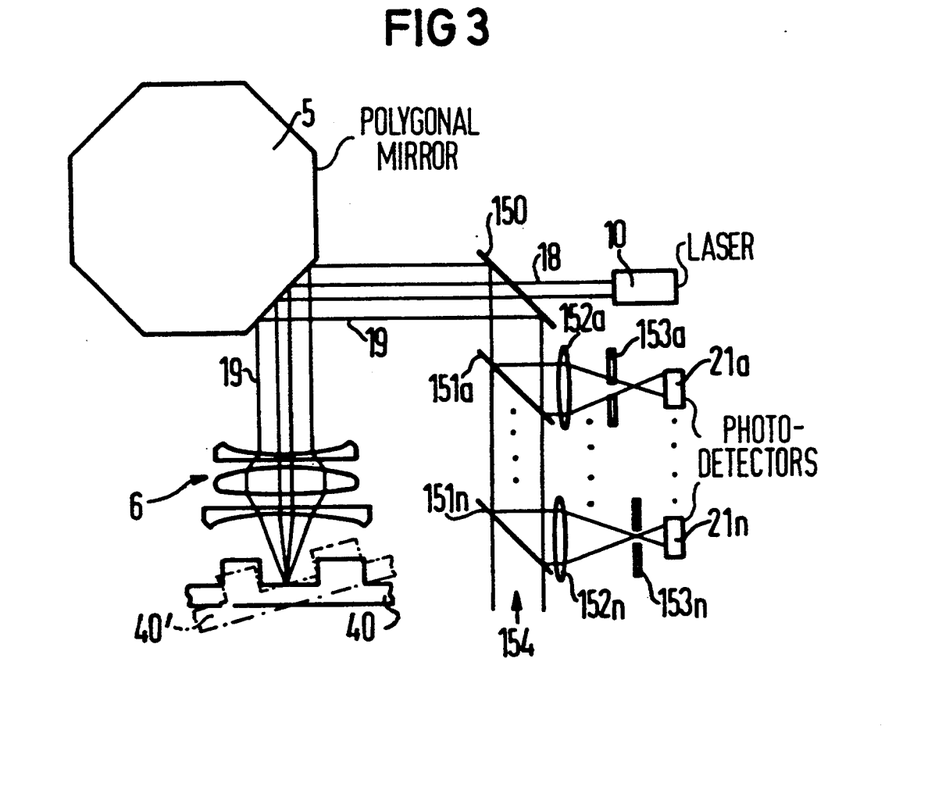
FIG. 3 shows schematic illustration of an optical distance sensor of confocal construction for rapid scanning by means of a rotating polygonal mirror, in which a multiplicity of parallel-operating detectors is present.

FIG. 3 shows a construction according to the invention, corresponding to a modified confocal principle. In this case, what is essential is the multistage confocal construction, which is executed by the splitting of the measurement beam 19 into a plurality of individual beams, each with an optical system 152$a$-$n$, a diaphragm 153$a$-$n$ and a photodetector 21$a$-$n$. The illumination beam 18 is generated by a laser 10 and directed by a coupling-out mirror 150 provided with a bore onto a rotating polygonal mirror 5. The latter reflects the illumination beam 18 in the direction of the surface of the object 40. Furthermore, a scanning objective 6 is present, which conducts the illumination beam 18 and the measurement beam 19 simultaneously in both directions. At the measurement location on the surface of the object 40, the numerical aperture of the illumination beam 18 is substantially smaller than the numerical aperture of the measurement beam 19. The measurement beam 19 conducted via the scanning objective is in turn conducted via the rotating polygonal mirror back onto the coupling-out mirror 150. After this, the measurement beam 19 is split in a beam splitting unit 154. In FIG. 3, only two splittings are shown specifically. In practice, in this case, depending upon the requirements, it is possible to place 16, 20 or more units. The beam splitting unit 154 can, as shown here, comprise splitter mirrors 151$a$-$n$. In order to reduce the mechanical complexity, however, the use of a diffraction grating or of a computer-generated hologram is also possible. The high degree of complexity involved in the production of a hologram can be compensated by the associated substantial advantages. Thus, the intensity distribution of the diffracted light can for example be influenced by an appropriately designed hologram, depending upon the requirements, in a predetermined manner. In the event of the use of a diffraction grating and also in the event of the use of splitter mirrors, an electronic compensation takes care of a uniform distribution of the intensities of the split measurement beams 19. A printed circuit board 40' is shown in broken outline at an angle to the sensor in order to be able to view three-dimensional objects obliquely from above as well.

Figure 4:
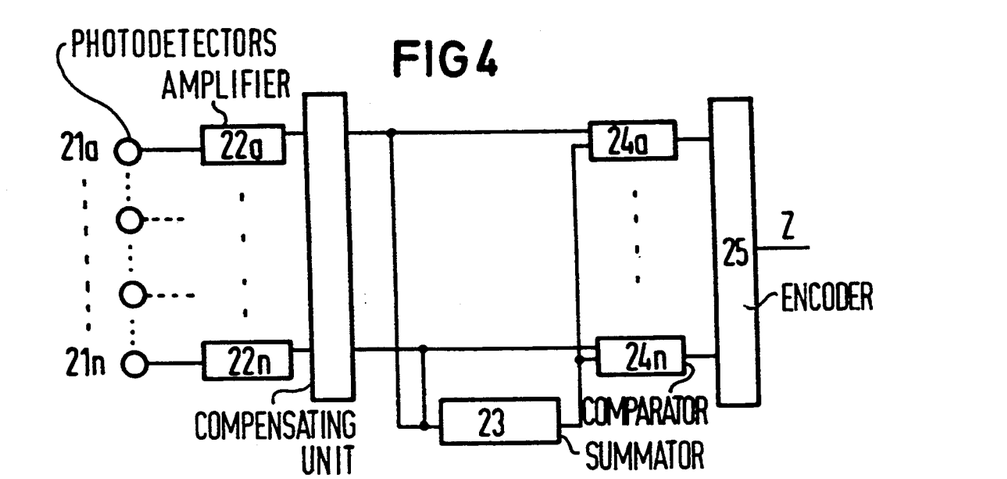
FIG. 4 shows a block diagram of the electronic sensor system for the parallel processing of the signals of the point photodetectors.

FIG. 4 shows an electronic evaluation system, which processes n different light intensities, corresponding to the existing plurality of photodetectors 21$a$-$n$. Each detector represents a height value within the depth of focus T and the electronic system finds the one with the highest power. This is achieved by means of a threshold, the height of which corresponds to a specified percentage value of the sum of all intensity values. If a plurality of signals exceed the threshold value, then the corresponding height values Z are to be averaged. The electronic evaluation system records the corresponding signals from the photodetectors 21$a$-$n$ via amplifiers 22$a$-$n$, adds them in the summator 23 and compares the individual values in comparators 24$a$-$n$ with the sum. The encoder 25 delivers the desired height value Z. In order to achieve a high pixel processing speed, this parallel processing mode is required. Sample/hold amplifiers can for example be used as amplifiers 22$a$-$n$. An electronic compensating unit is provided, which compensates non-uniform intensity distributions of the partial beams of the measurement beam onto the various photodetectors.

Figure 5:
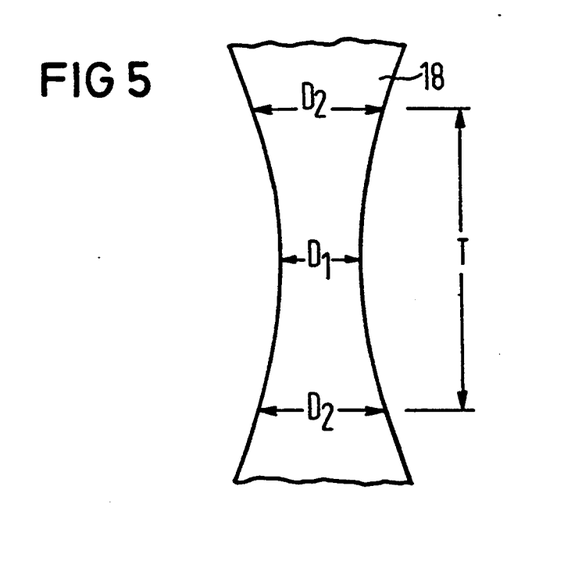
FIG. 5 shows an enlarged fragmentary view of the region of the focus of the illumination beam and, respectively, the depth of focus.

FIG. 5 diagrammatically shows the region of the focus of the illumination beam 18. This has, at its waist, or a narrow part a waist diameter D1. The depth of focus T is defined so that it corresponds to the length of the illumination beam in the region of the focus, between which in each instance the beam diameter D2 of the illumination beam 18 has risen, in both directions, to $\sqrt{2}$ times D1. The maximum height scanning range is predetermined by the depth of focus T. However, it can be altered by changing the scanning objective 6. Another possibility which, however, does not proceed in conformity with the increasing of the data rate, would be the mechanical movement of the object. A sensor according to the confocal principle in accordance with FIG. 1 is, accordingly, in terms of optics, sufficiently good, but is too slow for practical applications which are nowadays required.

As a result of the confocal principle, the disturbing action of secondary reflexes is per se to the greatest possible extent eliminated. To date, data rates achieved by this means were however at a level of approximately 100–1000 pixels per second. With an arrangement according to FIG. 3, the data rate may be increased to over $10^6$ pixels per second. Further advantages reside in that shadowings are noncritical, in so far as a sufficiently large solid angle is available for the detection. After the size of the photodetector has been adapted to the size of the illumination spot, only the illuminated location of the object 40 is imaged onto the detector, which comprises the photodetector 21a–n and the diaphragms 153a–n which are respectively connected upstream. The laser 10 shown in FIG. 3 delivers collimated light. The large depth of focus which exists at the object 40 as a result of the small diameter of the illumination beam 18 in the course of the illumination is converted into a relatively small depth of focus in the course of the imaging. As a result of the splitting into individual measurement beams 19, the resolution or the depth of focus is split into small depth of field ranges. In the dimensioning, the known optical dependencies between aperture, resolution, focal length etc have to be taken into consideration. Thus, the enlargement of the aperture means a higher resolution and the enlargement of the focal length involves a larger height measurement range in accordance with the larger depth of focus. However, in view of the fact that the measurement range and resolution are interdependent, for example at an aperture ratio of measurement beam and illumination beam 18, 19 of 25, with a height measurement range of 0.5 mm, it is possible to achieve a resolution of 20 $\mu$m. The resolution may be increased by appropriate interpolation between the height levels. An alteration of the height measurement range can be achieved in a simple manner by changing the scanning objective 6.

The slow lateral displacement of the object 40 in one [lacuna] directions can be avoided by an optical distance sensor according to FIG. 3. By using an additional galvanometer mirror, the lateral displacement of the object 40 could be entirely dispensed with. The second lateral scanning direction is serviced by scanning by means of the illumination beam 18. The height values Z are determined for each individual measurement point on the surface of the object 40 by means of the optical distance sensor. In this way, pixel rates of 2 MHz can be implemented. The data rate or scanning speed is dependent upon the polygonal mirror configuration. An embodiment of an optical distance sensor includes for example the following technical data:

Measurement beam diameter: 7.5 mm
Illumination beam diameter: 0.7 mm
Speed of rotation of the polygonal mirror (with 12 facets, utilization
factor 0.5): 15,000 rotations/minute
Scan length (lateral): 3.5 mm
Lateral resolution: 5 $\mu$m
Pixel/scan length: 700.

Within a scan, i.e. within a scanned line, with the above-indicated data the pixel data rate amounts to 4.2 MHz, which must be processed by the electronic sensor system. On account of the utilization factor of the polygonal mirror of 0.5, there is an effective pixel data rate of 2.1 MHz. At an average scanning speed of $2\times 10^6$ pixels/second, there is in the case of very complicated circuit boards for example an inspection time of 20 minutes for a surface area of $250\times 250$ mm. In the case of circuit boards of simple structure, the inspection time is in the region of a few minutes.

The electronic sensor system, connected to an optical distance sensor, corresponding to FIG. 4 also includes the photodetectors 21a–n. The photodiodes and amplifiers 22a–n which are employed in this case should exhibit a very large dynamic range with a short rise time, in order to be able to detect or compensate the extremely severe intensity fluctuations caused by the surface of the object 40. In order to overdrive the amplifier, amplifiers with a nonlinear gain characteristic can accordingly be used.

Besides the fact that with a distance sensor according to the invention specular surfaces can also be inspected, it is furthermore of importance that the intensity regulation of the illumination beam 18 can be dispensed with.

Figure 6:
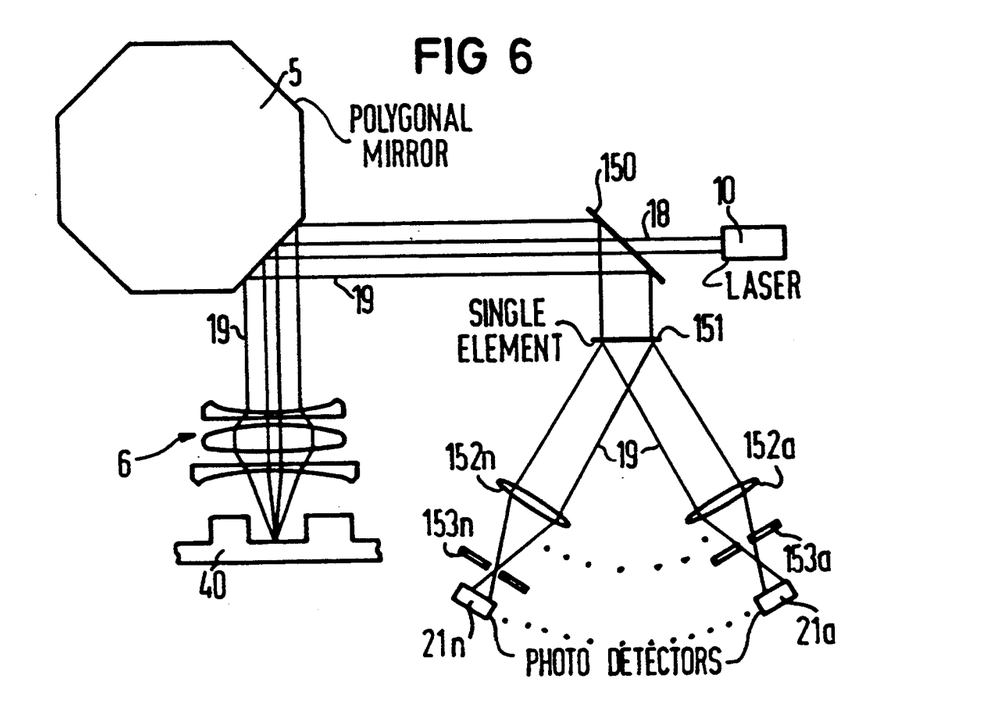
FIG. 6 is a schematic illustration of an optical distance sensor similar to that shown in FIG. 3 but with a single light deflecting element to resolve the beam into a plurality of beams.

FIG. 6 shows an arrangement similar to that shown in FIG. 3 but with the splitter mirrors replaced by a single light-deflecting, or light-diffracting, element 151 which splits the measurement beam (19) into a multiplicity of defined directions. The measuring beam 19 impinging this element is resolved into a plurality of measuring beams 19. The point photodetectors are disposed to be offset in the direction of the split measurement beams 19 for the distinguishing of height values within the depth of focus T of the illumination beam 18 and the respective height level is recognizable by the photodetector with the greatest light intensity. Thus, the relative arrangement of the photodetectors with respective optics and with a diaphragm relative to one another and relative to the measuring beam is generally the same an in FIG. 3.

Although other modifications and changes may be suggested by those skilled in the art, it is the intention of the inventors to embody within the patent warranted hereon all changes and modifications as reasonably and properly come within the scope of their contribution to the art.

Figure 7:
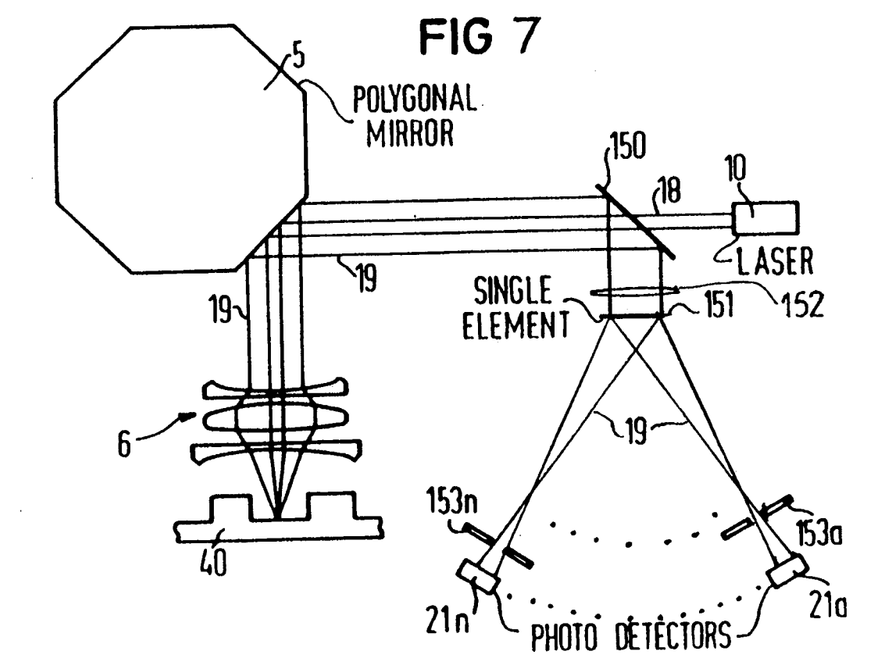
FIG. 7 is a schematic illustration of an optical distance sensor similar to that shown in FIG. 6 but with a single optical system to focus the beam onto the photodetectors.

FIG. 7 shows a schematic diagram of an arrangement similar to that shown in FIG. 6, although the plurality of optical systems of the previous embodiment is replaced by a single optical system 152. In the illustrated embodiment, the single optical system 152 is in the beam path before the light diffracting element 151, although it is also within the scope of the present invention to mount the single optical system 152 in the beam path after the diffraction element 151.

I claim:

1. An optical distance sensor for confocal optical imaging to determine height values and for three-dimensional surface measurement, comprising:
    a point light source for directing an illumination beam onto a measurement location on a surface to be measured so that a measuring beam is reflected from the surface,
    a beam deflection means for stepwise scanning of the surface with the illumination beam,
    a scanning objective, through which the illumination beam and the measurement beam are conducted,
    said scanning objective and said point light source causing the illumination beam to have, in relation to the measurement beam, a substantially smaller diameter in apertures of the scanning objective,
    said scanning objective causing an approximately equal diameter of the illumination beam and the measurement beam at the measurement location on the surface, said scanning objective causing the illumination beam to exhibit a distinctly greater depth of focus than the measurement beam,
    a beam splitting means for splitting the measurement beam into a plurality of split measurement beams,
    a plurality of optical systems and a nearly punctiform photodetectors positioned behind said beam splitting means in a direction of the split measurement beams to each receive one of said plurality of split measurement beams, the photodetectors being disposed offset in the direction of the split measurement beams for distinguishing of height values within the depth of focus of the illumination beam and a respective height level being recognizable by the photodetector with a greatest light intensity, said nearly punctiform photodetectors being of diameters so that the diameters of the illumination beam which alter with the height are imaged within the depth of focus precisely into the associated photodetectors.

2. An optical distance sensor as claimed in claim 1, wherein said beam splitting means comprises a plurality of splitter mirrors disposed one behind another in the measurement beam.

3. An optical distance sensor as claimed in claim 1, wherein said beam splitting means comprises a single light-diffracting element which splits the measurement beam into a multiplicity of defined directions, said nearly punctiform photodetectors being disposed offset in a direction of the split measurement beams for distinguishing of height values within the depth of focus of the illumination beam and a respective height level being recognizable by a photodetector with a greatest light intensity.

4. An optical distance sensor as claimed in claim 1, wherein said nearly punctiform photodetectors each include a diaphragm upstream from said photodetectors.

5. An optical distance sensor as claimed in claim 4, wherein the scanning objective is for a plurality of optical wavelengths in such a manner that the depth of field ranges of individual colors follow one another in succession in a row and intensities can be recorded by a plurality of color-sensitive photodetectors as a function of color.

6. An optical distance sensor as claimed in claim 1, wherein the point light source is a laser.

7. An optical distance sensor as claimed in claim 1, wherein the beam deflection means is a rotating polygonal mirror.

8. An optical distance sensor as claimed in claim 1, further comprising: a coupling-out mirror having a central bore is mounted to separate the illumination beam from the measurement beam.

9. An optical distance sensor as claimed in claim 1, wherein said scanning objective is such that a ratio between aperture angles of the measurement beam and the illumination beam at the measurement location amounts to at least 2:1.

10. An optical distance sensor as claimed in claim 1, wherein the scanning objective is constructed in telecentric fashion.

11. An optical distance sensor as claimed in claim 1, wherein for alteration of three-dimensional resolution and of a measurement range said scanning objective is formed to be of selectively variable focal length.

12. An optical distance sensor as claimed in claim 1, further comprising: an electronic compensating means for compensating non-uniform intensity distributions of the split measurement beams of the measurement beam onto the photodetectors.

13. An optical distance sensor as claimed in claim 1, further comprising: electronic amplifiers having a non-linear gain characteristic connected to the photodetectors to avoid overshoots.

14. An optical distance sensor as claimed in claim 1, wherein the distance sensor is mounted at an incline in relation to a normal to the surface, to view three-dimensional objects obliquely from above.

15. An optical distance sensor for confocal optical imaging to determine height values and for three-dimensional surface measurement, comprising:

a point light source for directing an illumination beam onto a measurement location on a surface to be measured so that a measuring beam is reflected from the surface, a beam deflection means for stepwise scanning of the surface with the illumination beam, a scanning objective, through which the illumination beam and the measurement beam are conducted, said scanning objective and said point light source causing the illumination beam to have, in relation to the measurement beam, a substantially smaller diameter in apertures of the scanning objective, said scanning objective causing an approximately equal diameter of the illumination beam and the measurement beam at the measurement location on the surface, said scanning objective causing the illumination beam to exhibit a distinctly greater depth of focus than the measurement beam, a beam splitting means for splitting the measurement beam into a plurality of split measurement beams, said beam splitting means comprising a single light-diffracting element which splits the measurement beam into a multiplicity of defined directions, a single optical system is disposed in a common beam path with the light-diffracting element, a plurality of nearly punctiform photodetectors positioned behind said beam splitting means in a direction of the split measurement beams to each receive one of said plurality of split measurement beams, the photodetectors being disposed offset in the direction of the split measurement beams for distinguishing of height values within the depth of focus of the illumination beam and a respective height level being recognizable by the photodetector with a greatest light intensity, said nearly punctiform photodetectors being of diameters so that the diameters of the illumination beam which alter with the height are imaged within the depth of focus precisely into the associated photodetectors.

* * * * *